United States Patent
Milanesi

(10) Patent No.: US 9,780,662 B1
(45) Date of Patent: Oct. 3, 2017

(54) METHOD FOR PORTABLE SENSOR-LESS DC-DC CONVERTER CONTROL LOOPS

(71) Applicant: Maxim Integrated Products, Inc., San Jose, CA (US)

(72) Inventor: Andrea Milanesi, Milan (IT)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 14/995,525

(22) Filed: Jan. 14, 2016

Related U.S. Application Data

(60) Provisional application No. 62/162,083, filed on May 15, 2015.

(51) Int. Cl.
*H02M 3/158* (2006.01)
*H02M 1/00* (2006.01)

(52) U.S. Cl.
CPC .... *H02M 3/158* (2013.01); *H02M 2001/0009* (2013.01)

(58) Field of Classification Search
CPC .... H02M 3/156; H02M 3/158; H02M 3/1582; H02M 2001/0025; H02M 2003/156; H02M 2003/158
See application file for complete search history.

(56) References Cited

U.S. PATENT DOCUMENTS

| | | | | |
|---|---|---|---|---|
| 8,138,740 B2* | 3/2012 | Yuan | ......................... | G05F 1/10 323/282 |
| 8,421,432 B2* | 4/2013 | Hawkes | ................ | H02M 3/156 323/283 |
| 8,624,566 B2* | 1/2014 | Sohma | .................. | H02M 3/156 323/222 |
| 2010/0066333 A1* | 3/2010 | Noda | ..................... | H02M 3/156 323/282 |
| 2014/0191736 A1* | 7/2014 | Babazadeh | ......... | H02M 3/1582 323/271 |
| 2014/0375295 A1* | 12/2014 | Ito | .......................... | H02M 3/158 323/300 |

* cited by examiner

*Primary Examiner* — Matthew Nguyen
(74) *Attorney, Agent, or Firm* — North Weber & Baugh LLP

(57) ABSTRACT

A portable control loop is provided for current sensing DC-DC converter. The DC-DC converter includes a power circuit, an external circuit, a control circuit and a duty cycle integration circuit. The power circuit comprises at least one controllable switch to regulate current from an input voltage. The external circuit comprises at least one output inductor and a capacitor. The duty cycle integration circuit receives a voltage differential signal across the output inductor and generates a compensation signal based at least on the voltage differential signal. The control circuit receives the compensation signal and feedback from load voltage and generates a control signal to control the controllable switch within the power circuit.

20 Claims, 3 Drawing Sheets

METHOD FOR PORTABLE SENSOR-LESS DC-DC CONVERTER CONTROL LOOPS

CROSS-REFERENCE TO RELATED APPLICATIONS

This application claims the benefit of Provisional Patent Application No. 62/162,083, titled, "Method for Portable Sensor-Less DC-DC Converter Control Loops, listing Andrea Milanesi as inventor, and filed May 15, 2015, which application is hereby incorporated herein by reference in its entirety.

BACKGROUND

A. Technical Field

The present invention relates generally to a control loop for DC-DC converter and method for its implementation for various DC-DC converters.

B. Background of the Invention

A DC-to-DC converter is an electronic circuit which converts a source of direct current (DC) from one voltage level to another. Electronic switch-mode DC to DC converters convert one DC voltage level to another, by storing the input energy temporarily, typically in an inductor, and then releasing that energy to the output at a different voltage. By adjusting the duty cycle of the charging voltage, the output voltage can be controlled or maintained within a desired range.

Typically, a current mode DC-DC converter needs to sense current in the inductor for a control loop, which would require a proper current slope compensation for control loop stability. Different DC-DC converters may have different specifications including inductor values. Because of the wide difference of the inductor current, the control loop may be specifically designed. The control loop for one DC-DC converter may not be applicable to another DC-DC converter.

It would be desirable to have a control loop for DC-DC converter with control loop structure relatively independent of inductor specification so that the control loop is portable and robust enough to be applicable for various DC-DC converters.

SUMMARY OF THE INVENTION

Embodiments of the invention relate to a portable control loop for current sensing and method for its implementation for various DC-DC converters.

In various embodiments, a portable control loop is provided for current sensing DC-DC converter. The DC-DC converter includes a power circuit, an external circuit, a control circuit and a duty cycle integration circuit. The power circuit comprises at least one controllable switch to regulate current from an input voltage. The external circuit comprises at least one output inductor and one output capacitor. The duty cycle integration circuit receives a voltage differential signal across the output inductor and generates a compensation signal based at least on the voltage differential signal. The control circuit receives the compensation signal and feedback from load voltage and generates a control signal to control the at least one controllable switch within the power circuit.

The duty cycle integration circuit and control circuit form a control loop allowing the control of the output voltage with the same compensation network of a Current Mode DC-DC converter without the need to sense the inductor current. The control loop keeps the output voltage stable by controlling the duty-cycle making the loop independent from the output inductor value.

In one embodiment, the integration signal is a saw-tooth signal $V_{SUM}$ generated with an operational transconductance amplifier (OTA) incorporated within the duty cycle integration circuit. This signal, instead of the inductor current, is used in the control loop to set a correct duty cycle for the controllable switch, and thus a desired output voltage to the load.

In another embodiment, a level shifter circuit (or a voltage divider) is added in order to shift the common mode of the input signal and reduce the input dynamic required by the GM stage; this allows the use of simple low voltage OTA with controlled transconductance (Gm) value. Besides a common mode control circuit is incorporated with the OTA to take into account of offset from OTA and mismatch between the level shifters (or the voltage dividers). These offsets can be compensated by adding the common mode control circuit, which might be a resistor $R_{CM}$ in the simplest implementation. The resistor $R_{CM}$ absorbs any offset related to the Gm stages, yet negligibly affects the voltage ripple on a summing capacitor $C_{SUM}$, which is coupled to the output of the OTA ($V_{SUM}$). Although the $V_{SUM}$ is affected as well by the $R_{DC}$ (equivalent DC resistance) of the output inductor, the common mode control circuit maintains the $V_{SUM}$ signal in a controlled voltage range that fits the input dynamics of the error comparator even the output inductor has a large $R_{DC}$.

In yet another embodiment, a second OTA is incorporated within the duty cycle integration circuit to provide a slope compensation signal to avoid sub-harmonics when the duty cycle it is larger than 50%. The second OTA provides an output signal proportional to the inductor current ripple to the control loop signals. The slope compensation is added only during the inductor charging phase in a current peak control scheme, or only during the inductor discharging phase in a valley control scheme.

The duty cycle integration circuit and control circuit form a control loop allowing the control of the output voltage with the same compensation network of a Current Mode DC-DC converter without the need to sense the inductor current. Once the complete control circuit is defined for a given topology with its own bandwidth compensating filter, the loop may be used as it is for various DC-DC converters with different current capabilities. The only components needing changes are the output inductor and output capacitor within the external circuit. The control loop is portable for various DC-DC converter topologies, such as buck converter or booster convert, as well with minimal changes required: usually the compensating network; in order to take into account the different singularities (for instance in the boost topology a right half-plane zero is present, which it is missing in the buck topology).

BRIEF DESCRIPTION OF THE DRAWINGS

Reference will be made to exemplary embodiments of the present invention that are illustrated in the accompanying figures. Those figures are intended to be illustrative, rather than limiting. Although the present invention is generally described in the context of those embodiments, it is not intended by so doing to limit the scope of the present invention to the particular features of the embodiments depicted and described.

One skilled in the art will recognize that various implementations and embodiments of the invention may be practiced in accordance with the specification. All of these implementations and embodiments are intended to be included within the scope of the invention.

DETAILED DESCRIPTION OF THE PREFERRED EMBODIMENTS

In the following description, for the purpose of explanation, specific details are set forth in order to provide an understanding of the present invention. The present invention may, however, be practiced without some or all of these details. The embodiments of the present invention described below may be incorporated into a number of different electrical components, circuits, devices, and systems. Structures and devices shown in block diagram are illustrative of exemplary embodiments of the present invention and are not to be used as a pretext by which to obscure broad teachings of the present invention. Connections between components within the figures are not intended to be limited to direct connections. Rather, connections between components may be modified, re-formatted, or otherwise changed by intermediary components.

When the specification makes reference to "one embodiment" or to "an embodiment", it is intended to mean that a particular feature, structure, characteristic, or function described in connection with the embodiment being discussed is included in at least one contemplated embodiment of the present invention. Thus, the appearance of the phrase, "in one embodiment," in different places in the specification does not constitute a plurality of references to a single embodiment of the present invention.

Various embodiments of the invention are used for a portable control loop for a current sensing DC-DC converter. The DC-DC converter includes a power circuit, an external circuit, a control circuit and a duty cycle integration circuit. The duty cycle integration circuit and control circuit form a control loop allowing the control of the output voltage with the same compensation network of a Current Mode DC-DC converter without the need to sense the inductor current. The control loop keeps the output voltage stable by controlling the duty-cycle making the loop independent from the output inductor value. The loop may be used as it is for various DC-DC converters with different current capabilities or different DC-DC converter topologies, such as buck converter or booster convert or any other controlled by means of a current sense (there are as well flyback DC-DC converters . . . ).

Figure 1:
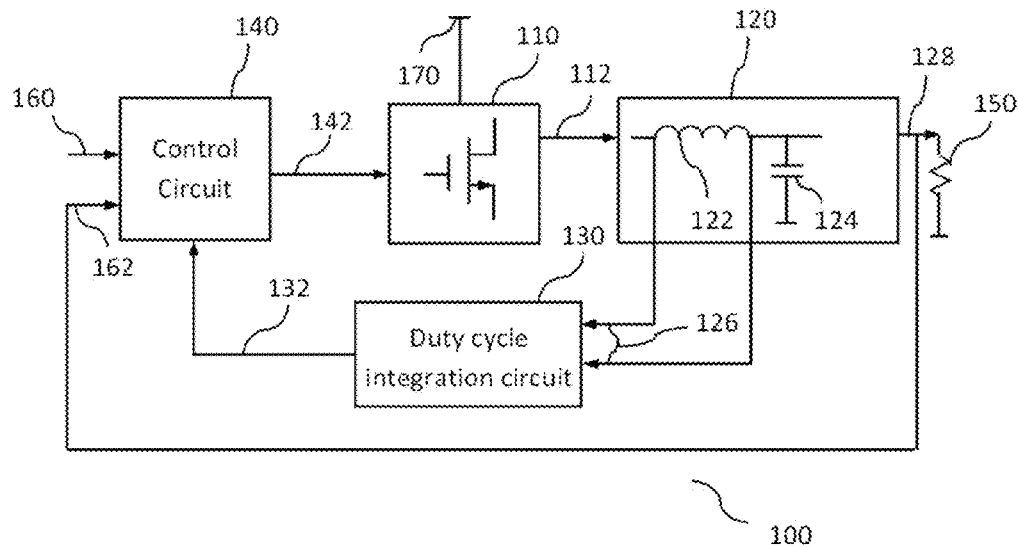
FIG. 1 is a block diagram of a DC-DC converter comprising a control loop in accordance with an embodiment of the present invention.

FIG. 1 shows a block diagram of a current mode DC-DC converter comprising a control loop in accordance with an embodiment of the present invention. The DC-DC converter 100 includes a power circuit 110, an external circuit 120, a control circuit 140 and a duty cycle integration circuit 130. The power circuit 110 comprises at least one controllable switch to regulate current from an input voltage 170. In one embodiment, the controllable switch may be a transistor switch, such as a p-channel or n-channel MOFET (metal-oxide-semiconductor field-effect transistor).

The external circuit 120 comprises at least one output inductor 122 and one output capacitor 124. The external circuit 120 receives an output 112 from the power circuit 110 and provides a final output 128 with a stable voltage value to the load 150. Typically, the output inductor is coupled in series between the power circuit 110 and the load 150. The output capacitor 124 is coupled in parallel to the load 150.

The duty cycle integration circuit 130 receives a voltage differential signal 126 across the output inductor 122 and generates a compensation signal 132 based at least on the voltage differential signal 126. The control circuit 140 receives a reference voltage signal 160, the compensation signal 132 and a feedback signal 162 coupled to the load 150, and generates a control signal 142 to control the at least one controllable switch within the power circuit 110. The control signal 142 may be a single-channel signal or a signal set comprising multiple channels. The power circuit 110, the external circuit 120, the control circuit 140 and the duty cycle integration circuit 130 form a control loop to generate a stable final output 128 to the load 150.

Figure 2:
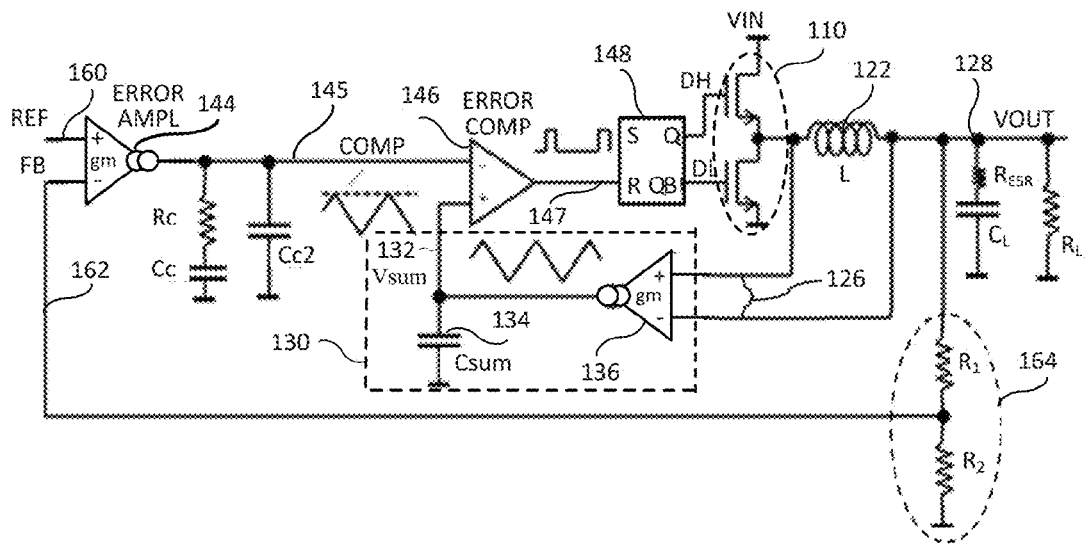
FIG. 2 is an exemplary schematic diagram of a DC-DC converter according to various embodiments of the invention.

FIG. 2 is an exemplary schematic diagram of a DC-DC converter according to various embodiments of the invention. The power circuit 110 comprises an upper transistor switch and a lower transistor switch in series connection and coupled between the input voltage $V_{IN}$ and ground. The duty cycle integration circuit 130 comprises a first feedback operational transconductance amplifier (OTA) 136 to receive the voltage differential signal 126 across the output inductor 122 and generates an output current signal from the voltage differential signal 126. The duty cycle integration circuit 130 further comprises a summation capacitor ($C_{SUM}$) 134 coupled to the output of the first feedback OTA 136. The output current from the OTA 136 is given by $GM_{SUM} \cdot V_L$, wherein the $V_L$ is the voltage across the output inductor 122 and $GM_{SUM}$ is the transconductance of the OTA 136. The output current from the OTA 136 is applied to the summation capacitor ($C_{SUM}$) 134 to generate the compensation signal 132 ($V_{SUM}$), which is typically a saw-tooth signal.

In one embodiment, the control circuit 140 comprises an error amplifier 144, an error comparator 146 and a SR flip-flop 148. The error amplifier 144 receives inputs from the reference voltage signal 160 and the feedback signal 162, and generates an output signal 145. The error amplifier 144 may be a regular operation amplifier or an OTA (depending on how the compensating network is implemented). The error comparator 146 couples to the error amplifier 144 to receive the output signal 145 and also the compensation signal 132 ($V_{SUM}$). The SR flip-flop 148 receives the output signal 147 from the error comparator 146 and generates the control signal 142 (comprising both DH and DL signals) to control both transistor switches within the power circuit 110.

In one embodiment, the feedback signal 162 is coupled to the load 150 via a first voltage divider 164 such that the feedback signal 162 is within a desired voltage range. The first voltage divider 164 may be a resistor type voltage divider, a resistor/capacitor mixture voltage divider, or the like.

The current transconductance $G_{CS}$ of the duty cycle integration circuit 130 is given by:

$$G_{CS} = \frac{C_{SUM}}{GM_{SUM} \cdot L} \quad (1)$$

wherein L is the inductance value of the output inductor 122.

The voltage ripple across $C_{SUM}$ can be calculated as:

$$V_{SUM\_RIPPLE} = \frac{V_{IN} - V_{OUT}}{C_{SUM}} \cdot GM_{SUM} \cdot t_{ON} \quad (2)$$

The current ripple in the output inductor 122 is given by:

$$I_{L\_RIPPLE} = \frac{V_{IN} - V_{OUT}}{L} \cdot t_{ON} \quad (3)$$

The $V_{IN}$ and $V_{OUT}$ are the voltage at the current-in terminal and current-out terminal of the output inductor and their difference are the voltage across the output inductor 122. Combining equations (1), (2) and (3), the current transconductance $G_{CS}$ is given by:

$$G_{CS} = \frac{C_{SUM}}{GM_{SUM} \cdot L} = \frac{I_{L\_RIPPLE}}{V_{SUM\_RIPPLE}} \quad (4)$$

The $G_{Loop}$ can be expressed as:

$$G_{LOOP} = \frac{R_2}{R_1 + R_2} \cdot \frac{GM_{EA} \cdot R_L}{s(C_C + C_{C2})} \cdot \frac{I_{L\_RIPPLE}}{V_{SUM\_RIPPLE}} \cdot \frac{(1 + sC_C R_C) \cdot (1 + sC_L R_{ESR})}{(1 + sC_L R_L) \cdot (1 + sC_{C2} R_C)} \quad (5)$$

Wherein the $R_1$ and $R_2$ are the resistors for the first voltage divider 164, $GM_{EA}$ is the transconductance of the error amplifier 144, $C_C$, $C_{C2}$ and $R_C$ are the compensation network at the output of the error amplifier 144 (and marked on FIG. 2 also), $C_L$ and $R_{ESR}$ are capacitance value and equivalent series resistance value of the output capacitor 150 (and marked on FIG. 2 also), $R_L$ is the load resistance.

As long as the input and output voltage do not change, $V_{SUM}$ ripple will not change. If the output current to the load needs to be increased by a factor 10, the output inductor has to be replaced with another one with lower inductance, in order to drive more current. If the output inductor is scaled down by a factor 10, the current ripple in the output inductor will be increased by a factor of 10, as well. The output voltage 128 ($V_{OUT}$) may be maintained at the same level if the output capacitor $C_L$ is increased by the same factor 10. By doing so, the singularities of the $G_{LOOP}$ formula do not change; hence the control loop may be applicable to DC-DC converters with different output current levels.

Figure 3:
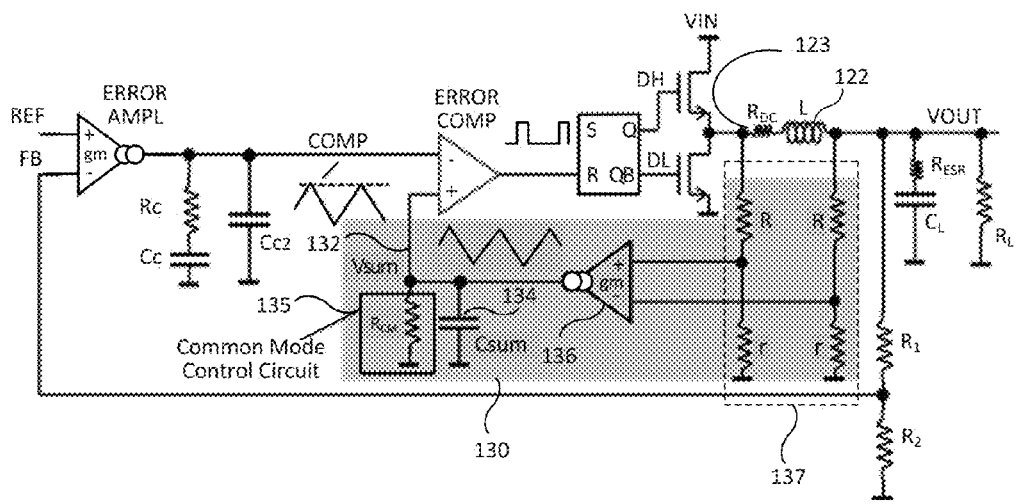
FIG. 3 is an exemplary schematic diagram of a DC-DC converter with voltage divider and a common mode control circuit according to various embodiments of the invention.

FIG. 3 is an exemplary schematic diagram of a DC-DC converter with voltage divider and a common mode control circuit according to various embodiments of the invention. Compared to FIG. 2, FIG. 3 takes into account of a series resistance $R_{DC}$ 123 of the output inductor 122. The offset of the series resistance $R_{DC}$ 123 can be compensated with a common mode control circuit 135 coupled to the output of the first feedback OTA 136. In one embodiment, the common mode control circuit 135 is just a resistor $R_{CM}$, which ensures the common mode voltage on the capacitor $C_{SUM}$ to comply with a desired dynamic. The resistor $R_{CM}$ absorbs any offset related to the Gm stages, yet negligibly affects the voltage ripple on a summing capacitor $C_{SUM}$, which is coupled to the output of the OTA ($V_{SUM}$). Although the $V_{SUM}$ is affected as well by the $R_{DC}$ (equivalent DC resistance) of the output inductor, the common mode control circuit maintains the $V_{SUM}$ signal in a controlled voltage range that fits the input dynamics of the error comparator even the output inductor has a large $R_{DC}$. Typically, the series resistance $R_{DC}$ 123 has a power ratio enough to absorb any offset related to the gm stages and also a resistance value high enough to negligibly affect the voltage ripple on the summing capacitor.

In one embodiment, a second voltage divider 137 is incorporated within the duty cycle integration circuit 130 to reduce the voltage differential signal 126 across the output inductor 122 to the first feedback OTA 136. The second voltage divider 137 comprises two identical voltage divider branches for both input signals of the OTA 136. Therefore, the linearity range requirement of the first feedback OTA 136 may be lowered. In this way all the control loop active circuits can be designed with low-voltage circuit referred to ground.

With the applied series resistance $R_{DC}$ 123 and the common mode resistor 135, the current transconductance $G_{CS}$ of the duty cycle integration circuit is expressed as:

$$G_{CS} = \frac{1}{GM_{SUM} \cdot R_{DC} \cdot R_{CM}} \cdot \frac{1 + sC_{SUM} R_{CM}}{1 + sL/R_{DC}} \quad (6)$$

At high frequencies, the current transconductance $G_{CS}$ becomes:

$$G_{CS} \cong \frac{C_{SUM}}{GM_{SUM} \cdot L} \quad (7)$$

At low frequencies, the current transconductance $G_{CS}$ becomes:

$$G_{CS} \cong \frac{1}{GM_{SUM} \cdot R_{DC} \cdot R_{CM}} \quad (8)$$

A flat transconductance for both high and low frequencies, the equation (7) needs to be the same as equation (8). Hence:

$$\frac{C_{SUM}}{GM_{SUM} \cdot L} = \frac{1}{GM_{SUM} \cdot R_{DC\_MAX} \cdot R_{CM}} \quad (9)$$

Hence the $R_{DC}$ value that will provide a flat current transconductance, for a given integrator filter, will be:

$$R_{DC\_MAX} = \frac{L}{C_{SUM} \cdot R_{CM}} \quad (10)$$

If the inductor series resistance is equal to the calculated $R_{DC\_MAX}$, the control loop is equivalent to a current mode control. If the inductor series resistor is smaller than the calculated $R_{DC\_MAX}$, the control loop is a sort of mix between a Voltage Mode and a Current Mode control. The control loop controls the output voltage without knowing the inductor DC current value, but with the advantage to keep the simple loop filter used in the current mode control.

Figure 4:
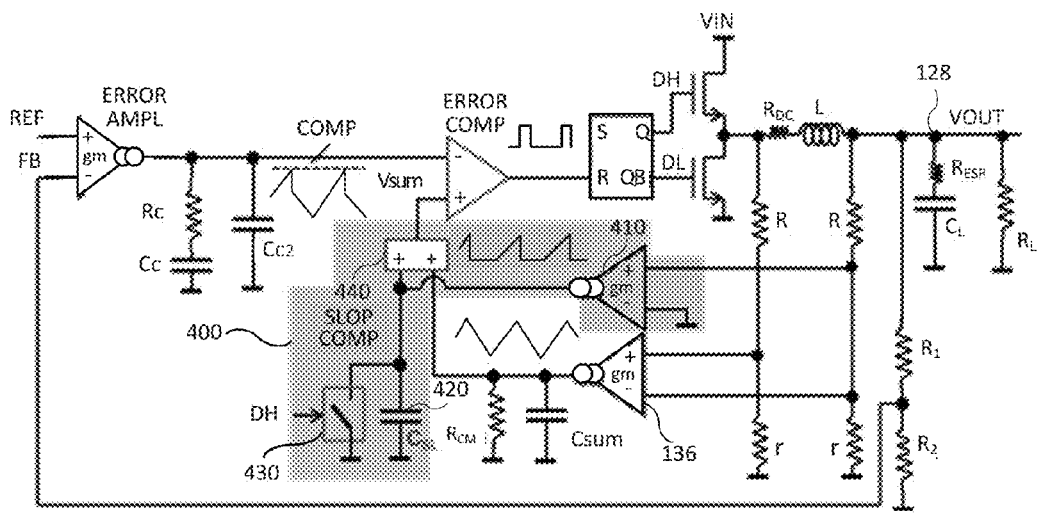
FIG. 4 is an exemplary schematic diagram of a DC-DC converter with additional slope compensation according to various embodiments of the invention.

FIG. 4 is an exemplary schematic diagram of a DC-DC converter with additional slope compensation according to various embodiments of the invention. For Current Mode Control Loop at high frequencies, there's the need of a slope compensation signal to avoid sub-harmonics when the duty cycle it is larger than 50% (in the case of a peak converter). In FIG. 4, a slope compensation circuit 400 is further incorporated for proper slope compensation. The slope comprises a slope compensation OTA 410, a slope compensation capacitor 420, a slope compensation control switch 430 and a summer circuit 440. The slope compensation OTA 410 couples to the output signal 128 via the same voltage divider 137 and has a current output coupled to the slope compensation capacitor ($C_{SL}$) 420. The summer circuit 440 receives inputs from both the slope compensation OTA 410 and the first feedback OTA 136, and sends a summation compensation output to the control circuit 140. The slope compensation control switch 430 couples to the output of the slope compensation OTA 410 and is controllable to ground the output of the slope compensation OTA 410.

In one embodiment, the slope compensation is engaged only during the inductor charging phase. Therefore, the slope compensation control switch 430 may also be controlled by means of the same control signal 142 (DH signal specifically, which controls the upper transistor switch). When the DH signal is low, the slope compensation control switch 430 is closed to ground the output of the slope compensation OTA 410 such that the slope compensation is not engaged and the summation compensation output is only sourced from the first feedback OTA 136. With such implementation, the slope compensation circuit may be able to provide correct slope compensation for any inductor or input/output voltage ratio (in a peak mode current control).

According to Dr. Ray Ridley ("*Current Mode Control Modelling*", Ray Ridley, 2001), the compensation ramp slope and the off time slope can be expressed as:

$$\frac{S_e}{S_f} = 1 - \frac{0.18}{D} \tag{11}$$

Where $S_e$ is the compensation ramp slope and $S_f$ is the off time slope. $S_e$ and $S_f$ are proportional respectively to Gm/CSL and Gm/CSUM in this topology; hence:

$$Gm/CSL = [1-(0.18/D)]*(Gm/CSUM) \tag{12}$$

Due to the fact the maximum duty cycle is 1, we can select $C_{SL}=(1/0.82)*C_{SUM}$. Slope compensation and sampling effects can be modeled with an high frequency expression:

$$f_h(s) = \frac{1}{1 + \frac{s}{Q_p \omega_n} + \frac{s^2}{\omega_n^2}} \tag{13}$$

where the double pole oscillation it is at half the switching frequency $\omega = \pi/T_S$.

The damping factor is given by:

$$Q_p = \frac{1}{\pi \cdot [m_C \cdot (1-D) - 0.5]} \tag{14}$$

The compensation ramp factor is defined as:

$$m_C = 1 + \frac{S_e}{S_n} \tag{15}$$

The slope compensation is:

$$S_e = \frac{(V_{IN} - V_{OUT}) \cdot GM_{SUM}}{C_{SUM}} \tag{16}$$

The charging current slope is:

$$S_n = 0.82 \cdot \frac{V_{OUT} \cdot GM_{SUM}}{C_{SUM}} \tag{17}$$

Substituting equations (16) and (17) into (15), the compensation ramp factor is:

$$m_C = 1 + \frac{0.82 \cdot V_{OUT}}{V_{IN} - V_{OUT}} \tag{18}$$

Equation (18) explains that the actual circuit provides a slope compensation always effective if the output inductor changes.

Adding the above equations, a more accurate expression for the control loop is shown below.

$$G_{LOOP} = \frac{R_2}{R_1 + R_2} \cdot \frac{GM_{EA} \cdot R_L}{s(C_C + C_{C2})} \cdot \frac{1}{GM_{SUM} \cdot R_{DC} \cdot R_{CM}} \cdot \tag{19}$$

$$\frac{1 + sC_{INT}R_{CM}}{1 + sL/R_{DC}} \cdot \frac{(1 + sC_C R_C) \cdot (1 + sC_L R_{ESR})}{\left(1 + \frac{s}{\omega_{p1}}\right) \cdot (1 + sC_{C2} R_C)} \cdot \frac{1}{1 + \frac{s}{Q_p \omega_n} + \frac{s^2}{\omega_n^2}}$$

where:

$$\omega_{p1} = \frac{1}{C_L R_L} + \frac{T}{LC} \cdot [m_c \cdot (1-D) - 0.5] \tag{20}$$

Figure 5:
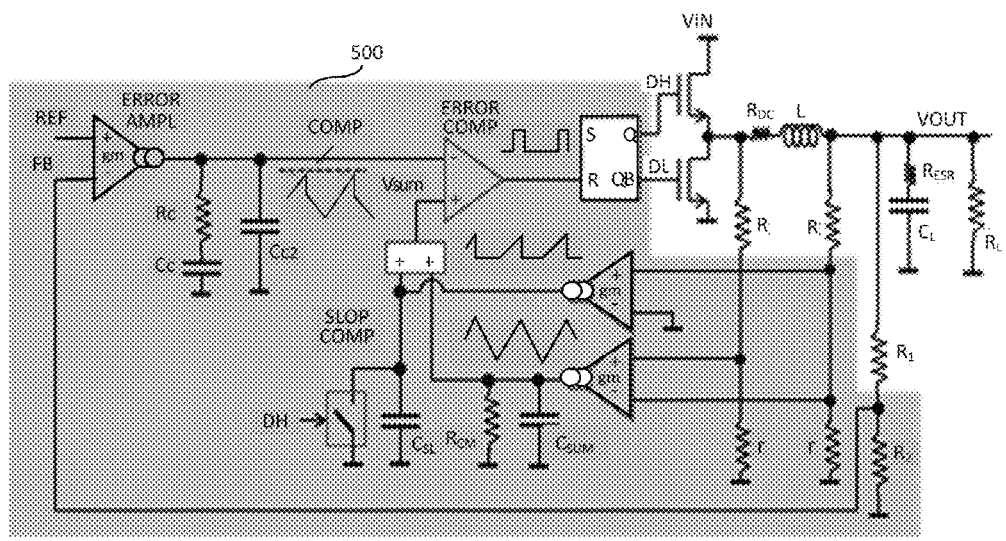
FIG. 5 is an exemplary schematic diagram of a DC-DC converter with portable control loop according to various embodiments of the invention.

FIG. 5 is an exemplary schematic diagram of a DC-DC converter with portable control loop according to various embodiments of the invention. All the low voltage circuits (500) used to control the transistor switches may be integrated into a single integrated circuit, a module or a modular circuit on single die, multiple die or print circuit board (PCB). The low voltage circuits 500 can be used as it is for another transistor switch circuit with different current capabilities as it is. The only components requiring modifications are the external components (output inductor L, $C_{load}$) and upper resistors in the voltage dividers (137 and 164) to ensure desired voltage input to the low voltage circuits 500. Therefore, all the low voltage circuits 500 (highlighted in FIG. 5) can be designed in standard LV CMOS technology making the circuits extremely portable.

Figure 6:
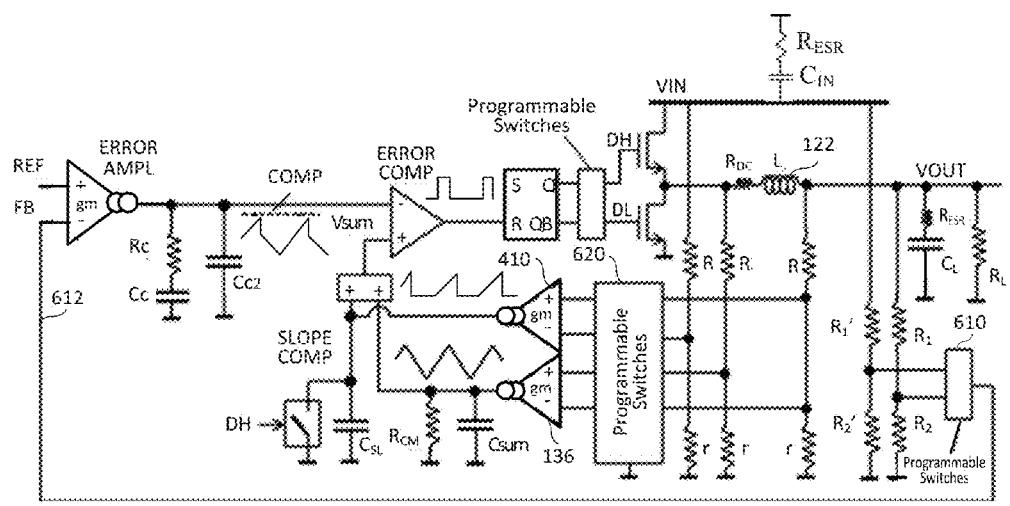
FIG. 6 is an exemplary schematic diagram of a DC-DC converter with programmable switches for various conversion topologies according to various embodiments of the invention.

FIG. 6 is an exemplary schematic diagram of a DC-DC converter with programmable switches for various conversion topologies according to various embodiments of the invention. A first programmable switch 610 and a second programmable switch 620 are incorporated within the low voltage circuits 500 (not shown in FIG. 6). The first programmable switch 610 couples to both $V_{IN}$ and $V_{OUT}$ (optionally via voltage dividers with the same voltage division ratio) and sends an output 612 to the control circuit 140 (the error amplifier 144 specifically). The output 612 may be selected from the $V_{IN}$ and $V_{OUT}$ depending on the DC-DC converter topology (buck or boost converter). Similarly, the second programmable switch 620 receives differential voltage signal across the output inductor 122, $V_{IN}$ and $V_{OUT}$ (optionally via voltage dividers with the same voltage division ratio), and assigns proper (or selected) signal/input combinations to the first feedback OTA 136 and the slope compensation OTA 410 depending on the DC-DC converter topology (buck or boost converter). Therefore, the control loop shown in FIG. 6 is suitable for various topologies with the choice of proper input signal and to control signal for the power stages (power circuit 110, not shown in FIG. 6).

In one embodiment, the input voltage line $V_{IN}$ is further coupled to an input capacitor $C_{IN}$ (with equivalent series resistance $R_{ESR}$) for output signal ripple filtering when the DC-DC converter is used as a reverse booster. Although FIG. 6 is shown with the exemplary compensation network, it is understood that various modification may be applied for the booster converter. For example, the overall compensation network may be simplified without the programmable switches and be used for a booster converter only, The foregoing description of the invention has been described for purposes of clarity and understanding. It is not intended to limit the invention to the precise form disclosed. Various modifications may be possible within the scope and equivalence of the application.

The invention claimed is:

1. A DC-DC converter comprising:
a power circuit comprising at least one controllable switch to regulate current from an input voltage;
an external circuit that provides an output signal to a load;
a duty cycle integration circuit that receives a voltage differential signal from the external circuit and generates a compensation signal based at least partially on the voltage differential signal; and
a control circuit that receives the compensation signal and a feedback signal from the load, the control circuit generates a control signal to control a duty cycle for the at least one controllable switch within the power circuit.

2. The DC-DC converter of claim 1 wherein the compensation signal is generated with a first operational transconductance amplifier (OTA) incorporated within the duty cycle integration circuit.

3. The DC-DC converter of claim 2 wherein the duty cycle integration circuit further comprises a summation capacitor coupled to an output of the first OTA to shape the compensation signal as a saw-tooth signal.

4. The DC-DC converter of claim 3 wherein the duty cycle integration circuit further comprises a second OTA receiving feedback from the output signal and generating a second OTA output, the second OTA output coupling to a slope compensation capacitor.

5. The DC-DC converter of claim 4 wherein the duty cycle integration circuit further comprises a summer circuit receiving the saw-tooth signal from the first OTA and the second OTA output from the second OTA, and generating a summation compensation output to the control circuit.

6. The DC-DC converter of claim 5 wherein the summer circuit receives the second OTA output only when the inductor is in a current peak control scheme during charging phase, or in a valley control scheme during discharging phase.

7. The DC-DC converter of claim 2 wherein the duty cycle integration circuit further comprises a common mode control circuit coupled to the output of the first OTA to absorb offset related to the first OTA.

8. The DC-DC converter of claim 7 wherein the common mode control circuit is a resistor.

9. A method for DC-DC conversion adaptive for various conversion topologies, the method comprising:
regulating current from an input voltage using a power circuit comprising at least one controllable switch;
providing an output signal to a load through an external circuit;
coupling a duty cycle integration circuit to the external circuit, the duty cycle integration circuit receiving a voltage differential signal from the external circuit and generating a compensation signal based at least partially on the voltage differential signal; and
coupling a control circuit to the duty cycle integration circuit and the power circuit, the control circuit receiving the compensation signal, a feedback signal from the load and generating a control signal to control a duty cycle for the at least one controllable switch.

10. The method of claim 9 wherein the compensation signal is a saw-tooth signal output from a first operational transconductance amplifier (OTA) within the duty cycle integration circuit, the first OTA having an output coupling to a summation capacitor.

11. The method of claim 10 wherein the duty cycle integration circuit further comprises a second OTA receiving feedback from the output signal and generating a second OTA output coupling to a slope compensation capacitor.

12. The method of claim 11 wherein the duty cycle integration circuit further comprises a summer circuit receiving the saw-tooth signal from the first OTA and the second OTA output from the second OTA, and generating a summation compensation output to the control circuit.

13. The method of claim 12 wherein a slope compensation control switch couples to the second OTA output and is controllable to ground the output of the second OTA.

14. The method of claim 13 wherein the slope compensation control switch is open only during a charging phase of the at least one output inductor.

15. The method of claim 10 wherein the duty cycle integration circuit further comprises a resistor coupled to the output of the first OTA to absorb any offset related to the first OTA.

16. The method of claim 9 wherein the control circuit receives the feedback signal from the load via a first voltage divider.

17. The method of claim 9 wherein the duty cycle integration circuit receives the voltage differential signal across the output inductor via a second voltage divider.

18. A DC-DC converter adaptive for various conversion topologies comprising:
a power circuit comprising at least one controllable switch to regulate current from an input voltage;
an external circuit comprises at least one output inductor and one output capacitor to provide an output signal to a load;

a first programmable switch coupled to both the input voltage and the output signal, and sending an output selected from the input voltage or the output signal depending on topology of the DC-DC converter;

a second programmable switch coupled to both the input voltage and the output signal, the second programmable switch receiving voltage signals from the input voltage and the output, and receiving signal differential voltage signal across the output inductor, and assigns selected voltage signal combinations to a first operational transconductance amplifier (OTA) and a second OTA depending on topology of the DC-DC converter, the first OTA generating a see-saw signal as a compensation signal and the second OTA generating a second OTA output as a slope compensation signal;

a summer circuit receiving the saw-tooth signal from the first OTA and the second OTA output from the second OTA, and generating a summation compensation output; and a control circuit receiving the summation compensation signal, a feedback from the output of the first programmable switch and generates a control signal to control a duty cycle for the at least one controllable switch within the power circuit.

19. The DC-DC converter of claim 18 wherein a slope compensation control switch couples to the second OTA output from the second OTA and is controllable to be closed and ground the output of the second OTA.

20. The DC-DC converter of claim 18 wherein the first and the second programmable switches couple to both the input voltage and the output signal via voltage dividers with the same voltage division ratio.

* * * * *